United States Patent [19]
Kompella et al.

[11] Patent Number: 5,892,754
[45] Date of Patent: Apr. 6, 1999

[54] USER CONTROLLED ADAPTIVE FLOW CONTROL FOR PACKET NETWORKS

[75] Inventors: Vachaspathi P. Kompella, Cary; James P. Gray, Chapel Hill; Frank D. Smith, Chapel Hill; Kevin Jeffay, Chapel Hill, all of N.C.

[73] Assignee: International Business Machines Corporation, Armonk, N.Y.

[21] Appl. No.: 660,317

[22] Filed: Jun. 7, 1996

[51] Int. Cl.[6] .................................................. H04L 12/56
[52] U.S. Cl. ...................... 370/236; 370/252; 370/406; 370/410
[58] Field of Search .................................... 370/231, 232, 370/235, 236, 252, 253, 400, 406, 410

[56] References Cited

U.S. PATENT DOCUMENTS

| | | | |
|---|---|---|---|
| 5,317,563 | 5/1994 | Oouchi et al. | 370/253 |
| 5,367,523 | 11/1994 | Chang et al. | 370/253 |
| 5,442,624 | 8/1995 | Bonomi et al. | 370/253 |
| 5,636,345 | 6/1997 | Valdevit | 370/253 |
| 5,701,292 | 12/1997 | Chiussi et al. | 370/253 |

*Primary Examiner*—Min Jung
*Attorney, Agent, or Firm*—Gerald R. Woods; The University of North Carolina at Chapel Hill

[57] ABSTRACT

A flow control system for packet transmission networks is centered in the user applications supplying data to the network. Changes in control are responsive to changes in the transmission parameters of the network, measured in the network and transmitted to the user application. The user application specifies desired ranges of Quality of Service parameters and, when the measured network parameters fall outside of the desired range, the user application modifies the transmission strategy to match the available transmission parameters. Measurements of network parameters are made over a pre-selected observation period to average the values of the transmission parameters.

25 Claims, 5 Drawing Sheets

USER CONTROLLED ADAPTIVE FLOW CONTROL FOR PACKET NETWORKS

TECHNICAL FIELD

This invention relates to packet communications systems and, more particularly, to traffic flow control in such systems.

BACKGROUND OF THE INVENTION

Numerous types of flow control have been devised for packet transmission systems. Such control mechanisms regulate a user application's behavior with respect to the transmission of data into the network and are typically implemented in the operating system and in the network protocol software. For example, if a user application attempts to send a large quantity of data to the network, and the network is overloaded, the network software buffers store the data that cannot be transmitted and attempts to deliver the data that can be transmitted. When there are no more buffers available, or if the buffers allocated to this application have been exhausted, the operating system typically suspends the user application, preventing the application from transmitting any more data until buffer space becomes available. The network protocol may also slow down the transmission of data because the receiving application cannot keep up with the data flow. These types of control mechanisms are known as flow control mechanisms. These network-based mechanisms are clearly not optimized for any particular user application, but are simply imposed on all user applications by the network.

Some flow control mechanisms in network protocols, such as the Transmission Control Protocol (TCP), are window oriented. That is, the receiving application will permit the transmitting user application to send only a certain amount of data (a "window") and, until the receiving application opens up the window further, the sending application is not allowed to transmit data. In TCP, the sending station backs off from its transmitting rate exponentially if acknowledgments from the receiving application do not arrive fast enough (before a local timer expires). These types of flow control mechanisms operate independently of the applications and often do not interact well with application requirements.

Another type of flow control mechanism is the so-called rate-based flow control, and includes High Performance Routing (HPR) in the Advanced Peer-to-Peer Network (APPN). These rate-based flow control mechanisms monitor the round-trip time of data flow and adjust the rate at which data is released from the transmitting application in response to the flow rate. That is, the rate-based flow control mechanism only allows data to enter into the network at a rate it (the network) has deemed sustainable over the long term, usually based on measurements of a test message sent to the receiving application. The application is thus constrained to transmit at this predetermined rate over the long term, even though transient rates may be greater due to buffering. Clearly, these constraints on the sending application are never optimal for the particular data being transmitted.

Having the network software act as a moderator of data flow into the network has significant advantages. The network is able to monitor its own behavior and thus determine overload situations. As taught in U.S. Pat. No. 5,326,523, the adaptive rate-based (ARB) flow control mechanism in HPR allows the data outflow to be controlled by the congestion status of the network, in effect allowing the data to flow out of a node at a rate commensurate with the actual congestion experienced in the network. For time-insensitive applications such as E-mail and file transfer, the rate-based adaptation of the network is excellent, relieving network overload without adding significant complexity to the user applications.

Unfortunately, for time-sensitive applications such as multimedia, audio and video conferencing and video-on-demand, network-implemented flow control mechanisms are totally inadequate. For example, if a video source, transmitting at thirty frames per second, is network flow controlled to deliver only twenty frames per second, the receiving application can either play the twenty frames that it receives (with gaps), and discard the ten frames that arrive late, or it may attempt to play all of the frames, but at the price of introducing substantial latency into the system. Neither of these results is particularly desirable since the quality or real time delivery of the picture is significantly degraded.

Many types of data applications are capable of performing satisfactorily at a number of different operating points in the multidimensional space defined by the network transmission parameters such as throughput, latency, latency variations, i.e., jitter, error rates, and so forth. For simplicity, the terms "transmission parameters" and "Quality of Service parameters" are used interchangeably in this application. In the above example, the video source could transmit fewer frames per second, obviating the need for transmitting the ten frames later, and providing a picture quality better than transmitting twenty of thirty frames and discarding the other ten frames. In general, user applications are capable of adapting to changing network conditions such as congestion in a variety of different ways such as using different coding, using data compression, different image sizes, different color representation, different frame rates, forward error correction, and so forth. None of these adaptations to network conditions can be used when adaptation is controlled solely by the network software. Similarly audio signals can be sensibly adapted to different transmission conditions by re-scaling the audio signals.

SUMMARY OF THE INVENTION

In accordance with the illustrative embodiment of the present invention, the state of congestion in a packet communications system is made available to the user applications utilizing that communications system. That is, the network facilities monitor the network so as to obtain the best possible information concerning the values of all of the network transmission parameters, including throughput, latency, jitter and so forth. However, since the network does not have the best information concerning how best to adapt to changes in these transmission parameters, these transmission parameter values are made available to each user application. More particularly, a programming interface with user applications is provided with extensions which enable the network software to inform the user applications of the values of these transmission parameters. The user application can be provided with a system call to inquire about the network transmission parameters, or the network software can asynchronously supply the user application with signals indicating the occurrence of events affecting transmission parameters. These event signals can be handled like other external event signals such as timer events, semaphore events, user signals, and so forth, which are already part of most operating systems. The latter technique, advising user applications of transmission parameter affecting events, is the preferred alternative since the user application may not know the best times to query the network for transmission parameters.

In accordance with one feature of the present invention, a certain amount of hysteresis in introduced into the event reporting process to prevent the application from responding to transient changes which do not persist over the long term. In particular, each application notifies the network of the Quality of Service (QoS) specifications required for that application. Such QoS specifications consist of a lower bound, an upper bound and an operating level for that parameter. The lower bound is the value of the parameter below which the application would like an input signal, the upper bound is the value of the parameter above which the application would like an input signal, and the operating level is the value at which the application would prefer to operate over the long term. The operating level need not be midway between the upper and lower bounds, but merely between these maximum and minimum values. The user application will then receive transmission parameter input signals only when the value of the parameter falls outside of the upper or lower bound. The provision of both upper and lower bounds is necessary to insure that the application can return to the preferred operating level after congestion has abated.

In accordance with another feature of the present invention, an observation period is specified for each transmission parameter. That is, each transmission parameter is monitored at the end of an observation period. If the monitored value of the parameter lies outside of the specified bounds, its value can be sent to the user application. In the alternative, if the instantaneous value of the parameter is unstable, some computed function of the parameter value may be used, such as an average or an exponential average, both to ensure that the value is actually within or outside of the bounds, and as the better value to be passed to the user application. If the user application realizes that the operating levels or bounds on any parameter are no longer suitable for the current network status, new operating points and bound values can be passed to the network, overriding the previous values.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
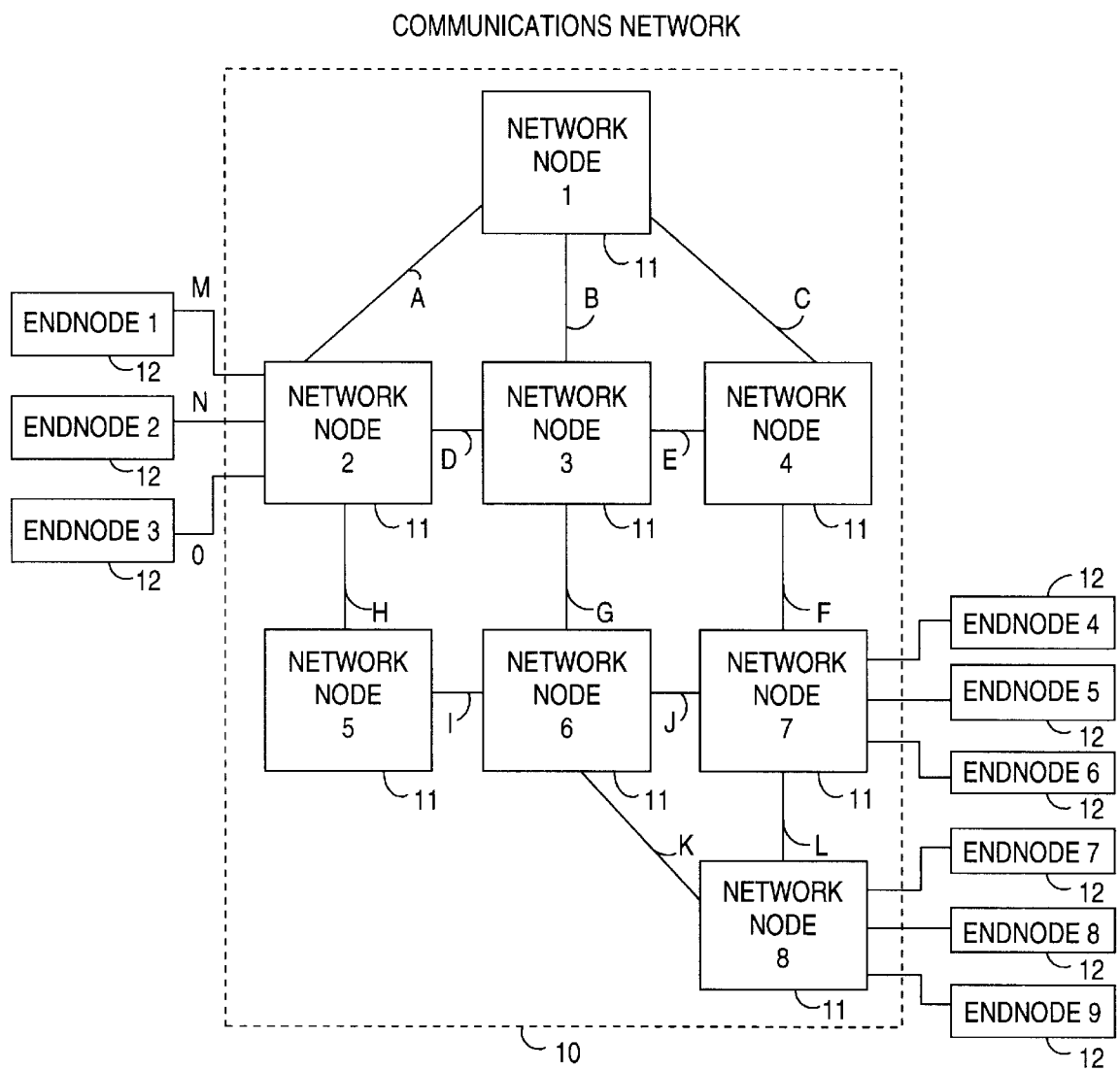
FIG. 1 shows a general block diagram of a packet communications network in which a user-controlled flow control mechanism in accordance with the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as providing decision points within the node. The network nodes 11 each comprise one or more decision points within the node, at which point incoming data packets are selectively routed on one or more of the outgoing communication links terminated within that node or at another node. Such routing decisions are made in response to information in the header of the data packet. The network node also provides ancillary services such as the calculation of new routes or paths between terminal nodes, the provision of access control to packets entering the network at that node, and the provision of directory services and topology database maintenance at that node. In accordance with the present invention, one or more of network nodes 11 can also comprise a centralized route management system.

Each of end nodes 12 comprises either a source of digital data to be transmitted to another end node, a utilization device for consuming digital data received from another end node, or both. Users of the packet communications network 10 of FIG. 1 may utilize an end node device 12 connected to the local network node 11 for access to the packet network 10. The local network node 11 translates the user's data into packets formatted appropriately for transmission on the packet network of FIG. 1 and generates the header which is used to route the packets through the network 10. In accordance with the present invention, one or more of nodes 11 and 12 of FIG. 1 is equipped to provide user-controlled data flow control for access to the network of FIG. 1.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available on each leg of the new connection. One such optimal route calculating systems is disclosed in U.S. Pat. No. 5,233,604 granted Aug. 3, 1993. Once such a route is calculated, a connection request message is launched on the network, following the computed route and updating the bandwidth occupancy of each link along the route to reflect the new connection. Data packets may then be transmitted along the calculated route from the originating node to the destination node (and from the destination node to the originating node) by placing this route in the header of the data packet. In prior art systems, if the network of FIG. 1 became congested, the network would detect this condition and limit the access of traffic to the system. While this procedure protected the system against overload, it was not always the best way to transmit the user's data, particularly multimedia video data requiring real time delivery.

Figure 2:
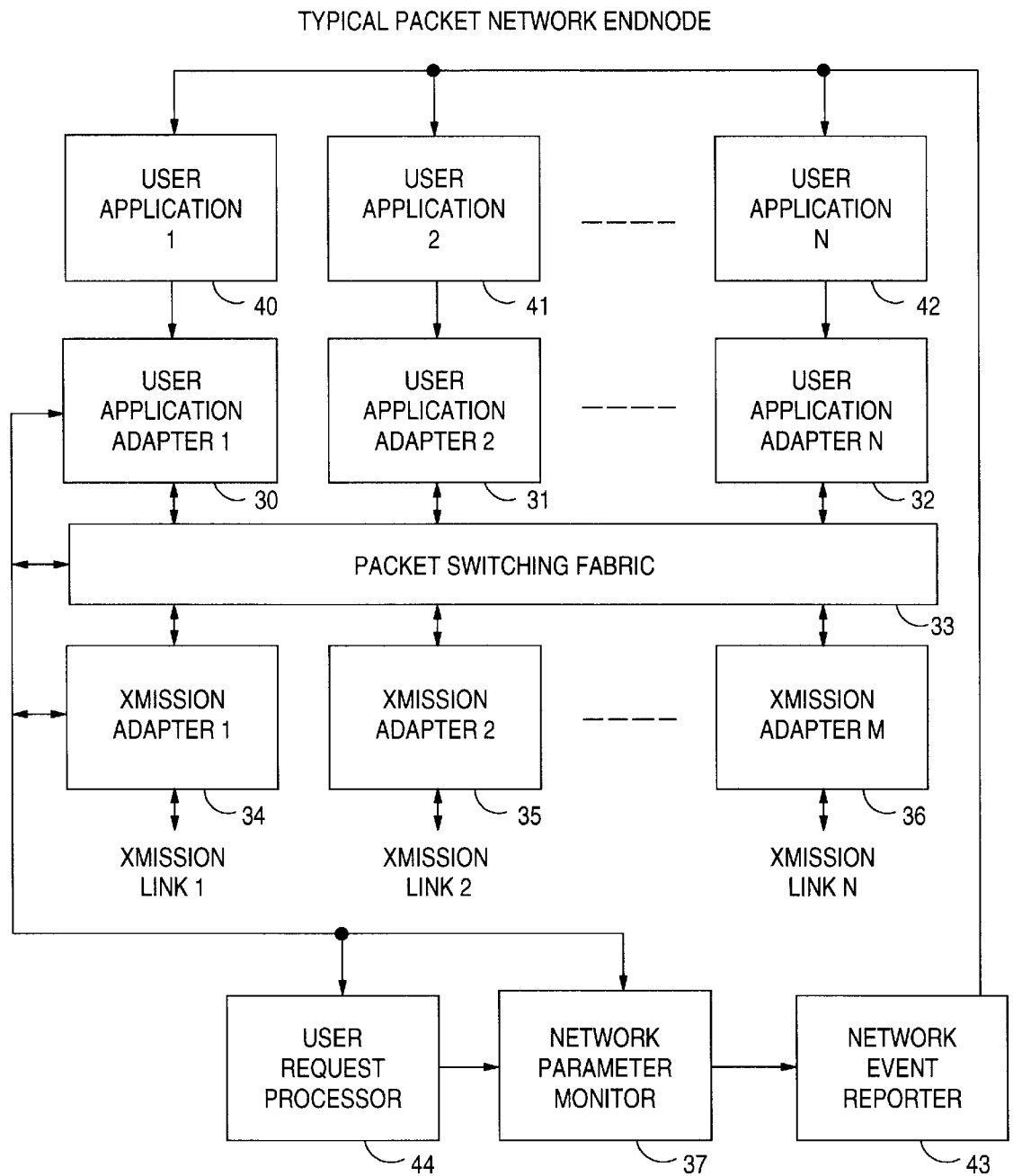
FIG. 2 shows a more detailed block diagram of typical endnode in the network of FIG. 1 at which point packets may enter the network to be forwarded along the route to a destination for each packet, and in which transmission parameter observation and user application notification of parameter variations in accordance with the present invention might find use.

In FIG. 2 there is shown a general block diagram of a network endnode control circuit which might be found in the nodes 12 of FIG. 1. The endnode control circuit of FIG. 2 comprises a high speed packet switching fabric 33 onto which packets arriving at the node are entered. Such packets arrive over transmission links from network nodes of the network, such as links M-O of FIG. 1 via transmission interfaces 34, 35 or 36, or are originated locally via local user interfaces 30, 31 or 32. Switching fabric 33, under the control of route controller 39, connects each of the incoming data packets to the appropriate one of the outgoing transmission link interfaces 34–36 or to the appropriate one of the local user interfaces 30–32, all in accordance with well known packet network operations. Indeed, network management control messages are also launched on, and received from, the packet network in the same fashion as data packets. That is, each network packet, data or control message, transmitted on the network of FIG. 1 can be routed by way of switching fabric 30, as shown in FIG. 2.

Routes or paths through the network of FIG. 1 are calculated to satisfy the Quality of Service (QoS) parameters determined to be necessary to adequately transmit a particular data stream as taught in the afore-mentioned U.S. Pat. No. 5,233,604. These Quality of Service parameters include such things as throughput (bandwidth), latency (path delay) and jitter (latency variations). If, due to changes in traffic loading or outages, the selected path is no longer capable of providing the desired QoS parameters, it is customary to restrict the access to the network in such a way as to reduce the load on the system. Such restricted access was imposed on input data streams regardless of the degradation thereby introduced into the transmitted signals.

In accordance with the present invention, some input signals to a packet communications network can be better accommodated in a network with reduced capability by the user application source of those input signals than by the network management facilities. Video and audio signals, for example, depend on real time delivery of the successive video frames for realistic reproduction of the moving picture. Delayed transmissions enforced by the network can degrade the video signals in such a fashion as to render the signal useless. The user application, on the other hand, can choose to reduce the frame rate of a video signal and thereby produce a useable, albeit degraded, video signal. The present invention provides a mechanism which allows the user application to control the flow control access to a network such as that of FIG. 1 by passing information about the state of the network to the user application, and allowing that user application to use this information to control the rate of data delivery to the network.

In accordance with the present invention, a user request processor 44 is provided in FIG. 2 to receive and process flow control requests from user applications 40–42. Such requests can include requests to access the network, requests to monitor certain Quality of Service parameters, and requests to change a particular Quality of Service parameter in response to changes in the network requiring flow control intervention. In response to a request processed in processor 44, network parameter monitor 37 uses prior art methods to monitor the desired parameter. As will be described hereinafter, this monitoring is particularized for a given network parameter and is averaged over a specified observation interval. Results of such monitoring are reported, using prior art signaling methods, to the user applications 40–42 by network event reporter 43. In response to these network events, user applications 40–42 control the flow of data from their respective applications into the network. The detailed processes which take place in blocks 44, 37, 43 and 40–42 are shown in the flow charts of FIGS. 3 through 5.

Figure 3:
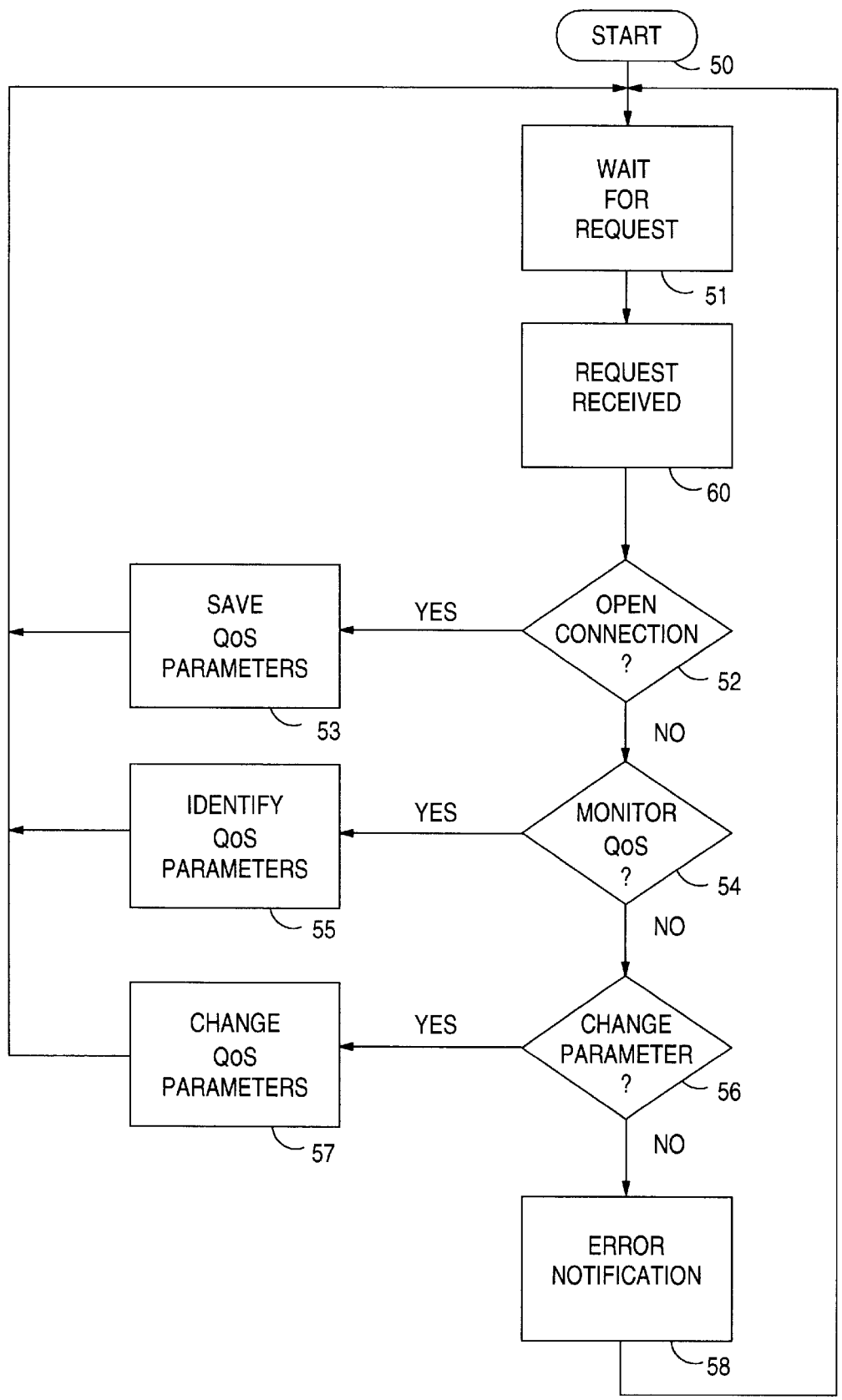
FIG. 3 shows a flow chart of the processing of user requests for opening a connection, and monitoring and controlling transmission parameters in processor 44 of FIG. 2, all in accordance with the present invention.
Figure 4:
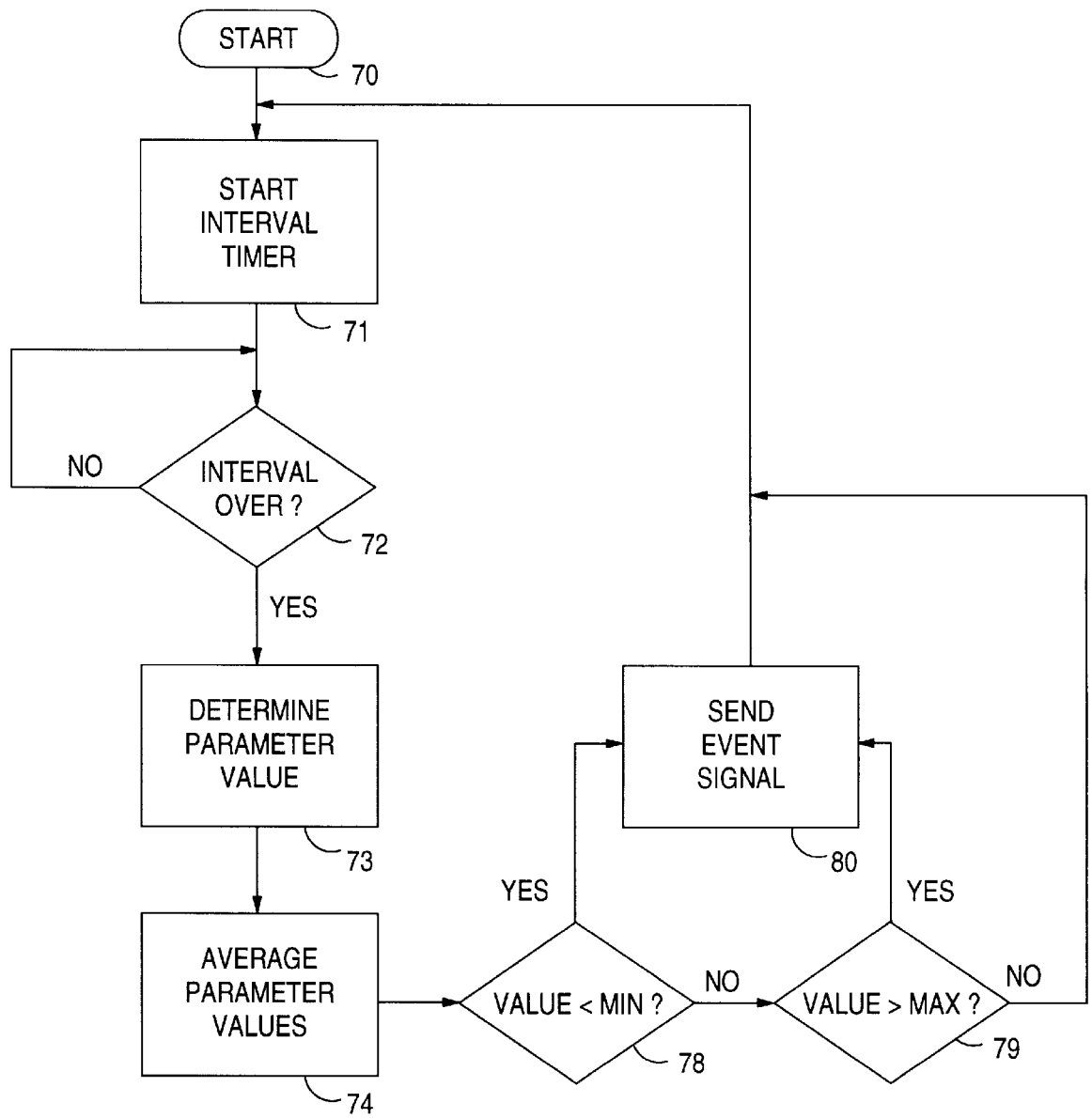
FIG. 4 shows a flow chart of the processing of transmission parameter violations in monitor 37 and reporter 43 of FIG. 2 in accordance with the present invention.
Figure 5:
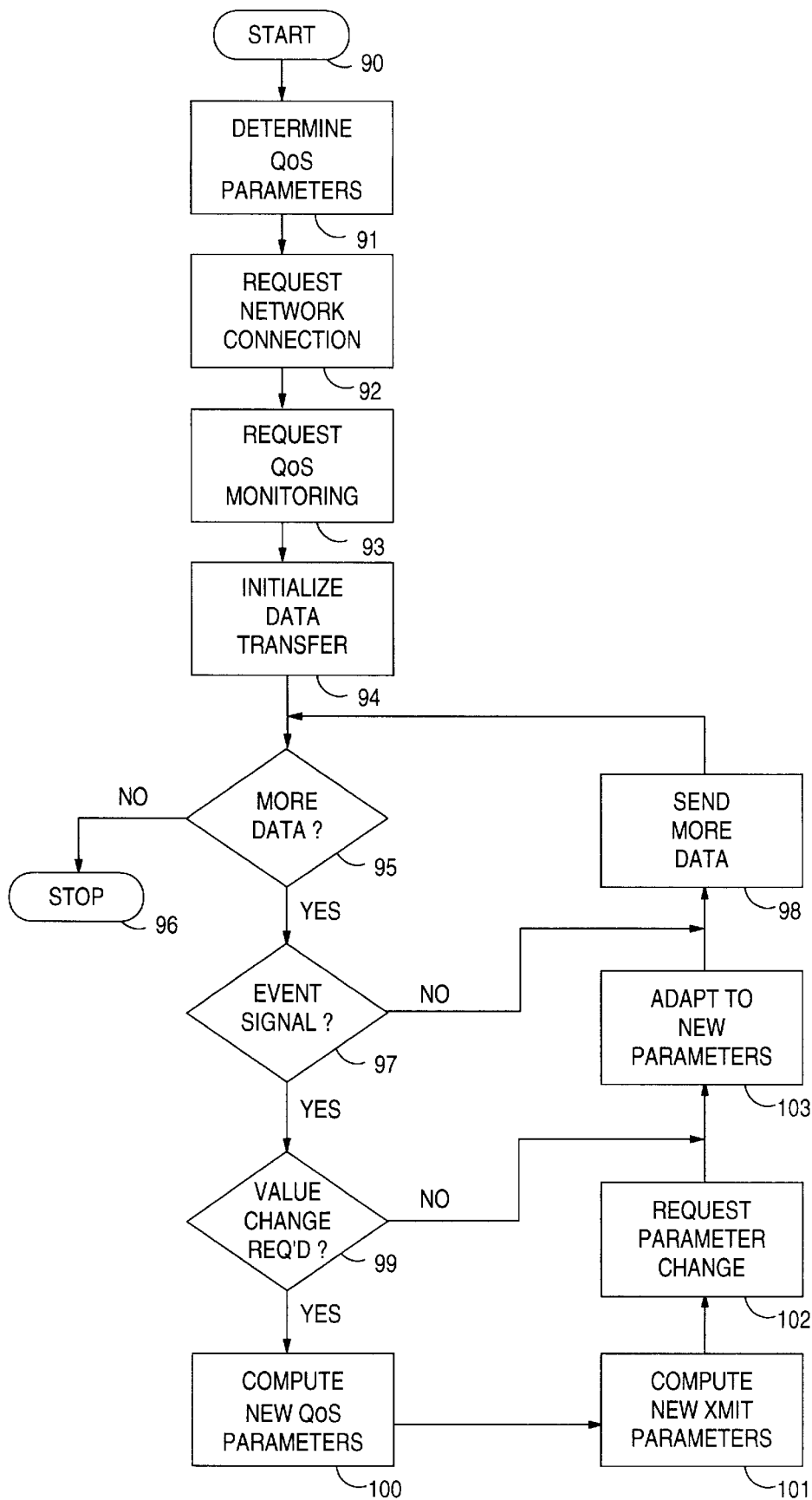
FIG. 5 shows a general flow chart of the process of adapting transmission parameters to changes in the quality of service provided by the network of FIG. 1, such process taking place in a user application such as applications 40, 41 and 42 of FIG. 2 in accordance with the present invention.

The processes of FIGS. 3 through 5 can, of course, be implemented by designing appropriate special purpose circuits. In the preferred embodiment, however, the processes of FIGS. 3–5 are implementing by programming a general purpose computer of the type normally used to control user stations in packet or cell transmission networks. Such programming is obvious to persons skilled in the network node control and operation arts and will not be further described here.

Referring then to FIG. 3, there is shown a flow chart of the processes taking place in the user request processor 44 of FIG. 2. Starting in start box 50, box 51 is entered where the processor waits for the next request from a user application. In box 60, it is detected that a request is received and, in decision box 52, it is determined whether or not the request is to open a new connection. If so, box 53 is entered where the Quality of Service parameters associated with the new connection are saved. These parameters are used to select a route for the new connection capable of satisfying these parameters. Once such a route is determined, the user requesting the new connection can begin transmitting data to the network for transmission along that route. At this time, the application has not specified which QoS parameter violations of which it would like to be notified.

If the new request is not for an open connection, as determined in decision box 52, then decision box 54 is entered to determine whether the request is to monitor a certain QoS parameter. If the request is to monitor a QoS parameter, box 55 is entered where the identification of the QoS parameters are ascertained (from the request) and passed on to network parameter monitor 37 of FIG. 2. At this time, the network is informed which QoS parameter violations are of interest to the application. Box 51 is then re-entered to await the next request from a user application.

If the new request is not to monitor a particular QoS parameter, as determined by decision box 54, decision box 56 is entered to determine if the new request is to change one of the QoS parameters currently being used for a particular connection from a particular user application. If so, box 57 is entered where the new value of that QoS parameter is substituted for the previously stored value from box 53 or from a previous action in box 57. After the QoS parameter is changed in box 57, box 51 is re-entered to await the next request from a user application.

If the new request is not to change the value of a QoS parameter, as determined by decision box 56, box 58 is entered where an error notification is sent to the user application and to the network manager. That is, if the user request is not for a new connection or to monitor a QoS parameter or to change a QoS parameter, then an error has occurred and the user application is so notified. Box 51 is then re-entered to await the next request from a user application.

In FIG. 4 there is shown a flow chart of the processing of QoS parameter violations detected in network parameter monitor 37 of FIG. 2. Before proceeding to a description of FIG. 4, it is first necessary to describe the operation of the flow control system of the present invention. Each user application, at the time of establishing a new connection, notifies the endnode 12 (FIG. 2) of the Quality of Service parameters required to properly transmit the data stream to be launched from that user application. Rather than simply sending the values of each parameter, the user application supplies the network with a triplet of values for each QoS parameter consisting of (1) the preferred operating value of that parameter, (2) a lower bound on the value of the parameter below which the user application wants to be notified so as to exercise a flow control option, and (3) an upper bound on the value of the parameter above which the user application wants to be notified so as to exercise a flow control option. In addition, for each QoS parameter, the application supplies an observation interval that determines, for the respective parameter, the frequency of monitoring that parameter. The user application is thus able to ignore small transitory changes in a parameter value and react only to larger, persistent changes. Thus, a certain amount of "hysteresis" is built into the flow control process, smoothing the application adaptation changes. With this in mind, FIG. 4 can now be described. As previously noted, Quality of Service parameters can include such metrics as bandwidth, latency and jitter. For the purposes of simplicity, FIG. 4 describes the monitoring of only a single QoS parameter. Those skilled in the art can extend FIG. 4 to accommodate the monitoring of any of the other possible parameters. Furthermore, the method of measuring the QoS parameters can be implemented in ways well known in the prior art and will not be specifically disclosed herein. The implementation of these other measurements is well known to anyone of ordinary skill in the art and can be implemented without any undue experimentation.

In FIG. 4, starting in start box 70, box 71 is entered where an observation interval timer is started. For simplicity, it is assumed that a separate interval timer is provided for each QoS parameter that is to be monitored. For efficiency, however, a plurality of different QoS parameters could be monitored simultaneously, using a common interval timer. The interval timer is used to sample the QoS parameter periodically, rather than continuously, in order to reduce the measurement overhead. After starting the interval timer in box 71, decision box 72 is entered to determine whether or not the observation interval is over, i.e., the interval timer has timed out. If not, decision box is re-entered to await the termination of the interval. When the observation timer does time out, the interval is recognized as being over and box 73 is entered to measure or determine the current value of the QoS parameter in question. This particular QoS parameter may be measured over the particular observation interval, such as accumulating jitter on a per data packet basis, or a measurement may be taken at the end of the observation interval, such as measuring latency by computing the round trip delay of a test message. The implementation of these measurement techniques are well known to those of ordinary skill in the art and will not be further described here.

In box 74, the measured or computed value of the parameter is smoothed by computing an average or exponential average or by using some other user-specified smoothing function. The resulting smoothed value is then used to test against the user-specified lower bound in decision box 78. If the smoothed value from box 74 is less than the lower bound set for that parameter, box 80 is entered to send an event signal to the user application notifying the user application of the violation of the lower bound and the actual smoothed value of the parameter. The user application can then use this value to determine the changes it will make in its transmission strategy to accommodate the new value of the QoS parameter. This process will be taken up in connection with FIG. 5.

If the smoothed value of the parameter is not below the minimum bound, as determined by decision box 78, decision box 79 is entered to determine if the smoothed value of the parameter is greater than the upper bound set for that parameter. If so, box 80 is entered to send an event signal to the user application notifying the user application of the violation of the upper bound and the actual measured value of the parameter. The user application uses this value to determine the changes it will make in the transmission strategy to accommodate the new parameter value. Box 71 is then reentered to start a new observation interval. If the measured value does not fall outside of the specified range, as determined by decision boxes 78 and 79, box 71 is re-entered to start the next measurement interval.

In FIG. 5 there is shown a flow chart of the processing of Quality of Service parameters by a user application, such as one of applications 40–42 of FIG. 2. Starting in start box 90, box 91 is entered the determine the desired Quality of Service parameters, and their respective allowable range of values, for a data stream to be transmitted over a desired new network connection. In box 92, a new network connection is requested (see FIG. 3) and, in box 93, the desired Quality of Service parameters are requested for the new connection. The network of FIG. 1 utilizes the specified Quality of Service parameters to select a route through the network of FIG. 1 which satisfies all of the specified parameters, all as taught in the above-mentioned U.S. Pat. No. 5,233,604. Next, box 93 is entered where the user application notifies the network which QoS parameters to monitor. Box 94 is then entered to initialize the transfer of data, for example, video or audio frames. Decision box 95 is then entered to determine if there is any more data signals to be transmitted. If not, the transmission is over and stop box 96 is entered to terminate the transmission process and the connection.

If more data is available for transmission, as determined by decision box 95, decision box 97 is entered to determine whether or not a QoS parameter violation event signal, transmitted in box 80 of FIG. 4, has been received. If not, box 98 is entered to transmit one data frame through the network of FIG. 1, along the selected route. Decision box 95 is then re-entered to determine if the transmission of any more data frames is required. If a QoS parameter violation event signal has been received, as determined decision box 97, then decision box 99 is entered to determine whether or not the transmission parameters of the user application should be changed in response to the parameter violation. If a change is necessary, box 100 is entered where the user application determines the best action to take in response to the parameter violation, depending on the type of data signal being transmitted, e.g. changing the coding method to reduce bandwidth utilization or packing more signal samples into the same packet to reduce the effects of jitter. The QoS parameters required for change in transmission strategy are computed in box 100 and the resulting new transmission parameters are computed in box 101. Box 102 is then entered to request the necessary changes in the QoS parameters as shown in FIG. 3. Box 103 is then entered to make the actual changes in the transmission strategy which are necessary to accommodate the violation of the previous parameters. When the transmission adaptations have been effected in box 103, box 98 is re-entered to transmit the next data frame over the connection, using the new transmission strategy. Decision box 95 is then re-entered to continue transmitting data using the new strategy.

If no transmission parameter changes are necessary, as determined by decision box 99, but a violation event signal has been received, as determined by decision box 97, then box 103 is entered to make the necessary adaptation to the violation, but using all of the previously established QoS parameters. Transmission then continues, using the new adaptive strategy. It can be seen that the process of FIG. 5 permits the user application to adapt the flow of information into the network to maximize the use of the available network path parameters. Since the user application is in a better position to optimize the transmission of the data stream originating at that user application than is the network manager, superior flow control results from giving the user application control over the data flow into the network. This is in distinct contrast to prior art, network-controlled data flow mechanisms applied uniformly for all data streams regardless of the special requirements of the particular data stream.

What is claimed is:

1. A packet transmission network comprising
   a plurality of transmission nodes interconnected by transmission links,
   a plurality of user applications for transmitting data streams on said network, said data streams having at least two different modes of transmission requiring different transmission parameters,
   means for selecting a data path through said network between two of said user applications to satisfy the transmission parameters of one of said two different modes of transmission,
   means for detecting changes in the transmission parameters available on said selected data path,
   means for notifying said user applications of said changes in the transmission parameters, and
   means, responsive to said means for notifying, for changing to the other of said two different modes of transmission at said user application.

2. The packet transmission network according to claim 1 further comprising
   means at each of said user applications for specifying a range of values of said transmission parameters within which said one mode of transmission remains unchanged.

3. The packet transmission network according to claim 1 further comprising
   means, in each said user application, for requesting changes in said transmission parameters for a particular connection.

4. The packet transmission network according to claim 1 further comprising
   means for storing the quality of service transmission parameters requested by each of said user applications for each requested connection to said user application.

5. The packet transmission network according to claim 1 further comprising
   means for computing a smoothing function of the transmission parameter values on each connection through said network for a predetermined observation interval.

6. The packet transmission network according to claim 1 further comprising
   means for transmitting an event signal to said user applications when said transmission parameters fall outside of said specified range of values.

7. A method for operating a packet transmission network comprising the steps of
   interconnecting a plurality of transmission nodes by transmission links,
   transmitting a plurality of data streams from user applications connected to said network, said data streams having at least two different modes of transmission requiring different transmission parameters,
   selecting a data path through said network between two of said user applications to satisfy the transmission parameters of one of said two different modes of transmission,
   detecting changes in the transmission parameters available on said selected data path,
   notifying said user applications of said changes in the transmission parameters, and
   in response to said step of notifying, changing to the other of said two different modes of transmission at said user application.

8. The method according to claim 7 further comprising the step of
   at each of said user applications, specifying a range of values of said transmission parameters within which said one mode of transmission remains unchanged.

9. The method according to claim 7 further comprising the step of
   in each said user application, requesting changes in said transmission parameters for a particular connection.

10. The method according to claim 7 further comprising the step of
    storing the quality of service transmission parameters requested by each of said user applications for each requested connection to said user application.

11. The method according to claim 7 further comprising the step of
    smoothing the values of transmission parameters for each connection through said network.

12. The method according to claim 7 further comprising the step of
    transmitting an event signal to said user applications when said transmission parameters fall outside of said specified range of values.

13. A data flow control system for packet communications systems connected to a plurality of user applications comprising
    means in said packet communications system for measuring the transmission parameters of at least one route from one of said user applications to another of said user applications,
    means in each of said user applications, responsive to said means for measuring, for changing the flow rate of data transmitted over said at least one route,
    means in said user applications for specifying a range of permissible values for each of said transmission parameters, and
    means in each of said user applications for requesting changes in the requested transmission parameters for said at least one route.

14. The data flow control system according to claim 13 further comprising
    means for storing the quality of service parameters for said at least one route in said packet communications system.

15. The data flow control system according to claim 13 further comprising
    means in said packet communications system for smoothing the values of said transmission parameters.

16. A method for controlling data flow into a packet communication system connected to a plurality of user applications comprising the steps of
    in said packet communications system, measuring the transmission parameters of at least one route from one of said user applications to another of said user applications,
    in each of said user applications, in response to said means for measuring, changing the flow rate of data transmitted over said at least one route,
    in each of said user applications, specifying a range of permissible values for each of said transmission parameters, and in each of said user applications, requesting changes in the requested transmission parameters for said at least one route.

17. The method according to claim 16 further comprising the step of
storing the quality of service parameters for said at least one route in said packet communications system.

18. The method according to claim 16 further comprising
in said packet communications system, smoothing the values of said transmission parameters over a predetermined measuring interval.

19. A packet transmission network comprising
a plurality of transmission nodes interconnected by transmission links,
a plurality of user applications for transmitting data streams on said network, said data streams having at least two different modes of transmission requiring different transmission parameters,
means for selecting a data path through said network between two of said user applications to satisfy the transmission parameters of one of said two different modes of transmission,
means for detecting changes in the transmission parameters available on said selected data path,
means for notifying said user applications of said changes in the transmission parameters,
means, responsive to said means for notifying, for changing to the other of said two different modes of transmission at said user application, means in each said user application for requesting a new connection satisfying a specified range of transmission parameters,
means in each said user application for requesting said network to monitor specified network parameters for each said connection, and
means in each said user application for requesting changes in said specified transmission parameters.

20. A method for operating a packet transmission network comprising the steps of
interconnecting a plurality of transmission nodes by transmission links,
transmitting a plurality of data streams from user applications connected to said network, said data streams having at least two different modes of transmission requiring different transmission parameters,
selecting a data path through said network between two of said user applications to satisfy the transmission parameters of one of said two different modes of transmission,
detecting changes in the transmission parameters available on said selected data path,
notifying said user applications of said changes in the transmission parameters,
in response to said step of notifying, changing to the other of said two different modes of transmission at said user application,
in each said user application, requesting a new connection satisfying a specified range of transmission parameters,
in each said user application, requesting said network to monitor specified network parameters for each said connection, and
in each said user application, requesting changes in said specified transmission parameters.

21. A data flow control system for packet communications systems connected to a plurality of user applications comprising means in said packet communications system for measuring the transmission parameters of at least one route from one of said user applications to another of said user applications, and
in each of said user applications,
means responsive to said means for measuring, for changing the flow rate of data transmitted over said at least one route,
means for requesting a new route through said packet communications system satisfying specified ranges of values of transmission parameters,
means for requesting the measurement of specific transmission parameters over a specified route, and
means for requesting a change in a previously specified transmission parameter.

22. A method for controlling data flow into a packet communications system connected to a plurality of user applications comprising the steps of
in said packet communications system, measuring the transmission parameters of at least one route from one of said user applications to another of said user applications,
in each of said user applications, in response to said means for measuring,
changing the flow rate of data transmitted over said at least one route,
requesting a new route through said packet communications system satisfying specified ranges of values of transmission parameters,
requesting the measurement of specific transmission parameters over a specified route, and
requesting a change in a previously specified transmission parameter.

23. In a user application for use with a packet transmission network having a plurality of transmission nodes interconnected by transmission links, a network route selector for selecting a data path through said network between said user application and a second user application, said user application transmitting a data stream on said network in one of at least two different modes of transmission requiring different transmission parameters, a network parameter monitor for detecting changes in transmission parameters available on a selected data path and a network event reporter for providing notification of detected changes in transmission parameters, a flow control system comprising:
means for receiving a notification of a change in transmission parameters on the selected data path from the network event reporter; and
means responsive to the receipt of said notification to change a different one of the different modes of transmission.

24. A flow control system as defined in claim 23 further including means for requesting changes in transmission parameters for the selected data path.

25. A flow control system as defined in claim 23 further including:
means for requesting a new connection to a second user application satisfying a specified range of transmission parameters,
means for specifying network parameters to be monitored by the network parameter monitor, and
means for requesting changes in the network in transmission parameters established for a connection.

* * * * *

UNITED STATES PATENT AND TRADEMARK OFFICE
CERTIFICATE OF CORRECTION

PATENT NO. : 5,892,754
DATED : April 6, 1999
INVENTOR(S) : Kompella et al

It is certified that error appears in the above-identified patent and that said Letters Patent is hereby corrected as shown below:

On the face of the patent please add to the Assignee field "The University of North Carolina at Chapel Hill".

Signed and Sealed this

Thirty-first Day of August, 1999

Attest:

Q. TODD DICKINSON

Attesting Officer

Acting Commissioner of Patents and Trademarks